Sept. 2, 1958     G. G. GUNSBERG     2,850,392

FROZEN FOOD PACKAGE

Filed March 7, 1955     4 Sheets—Sheet 1

INVENTOR.
GEORGE G. GUNSBERG
BY
Robert D. Menteg
ATTORNEY

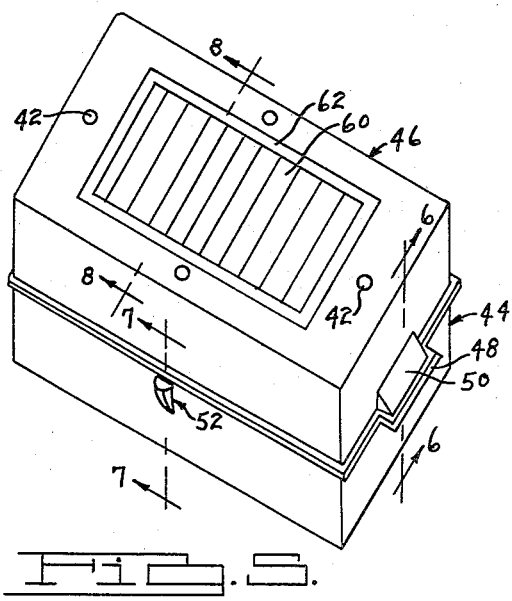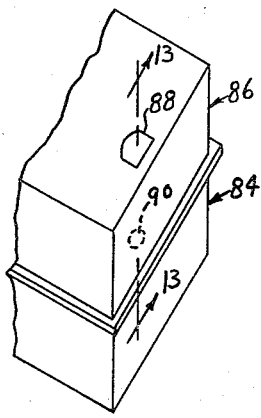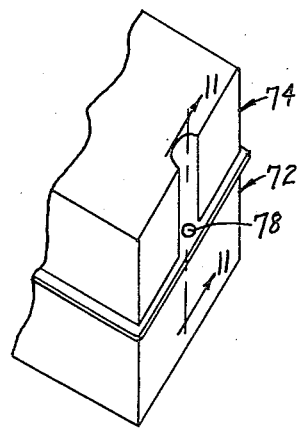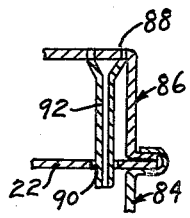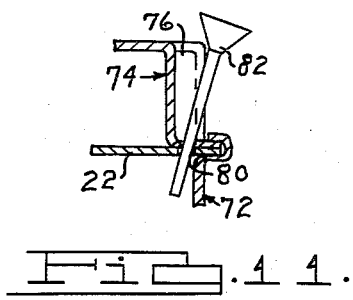
INVENTOR.
GEORGE G. GUNSBERG
BY
Robert G. Mentag
ATTORNEY

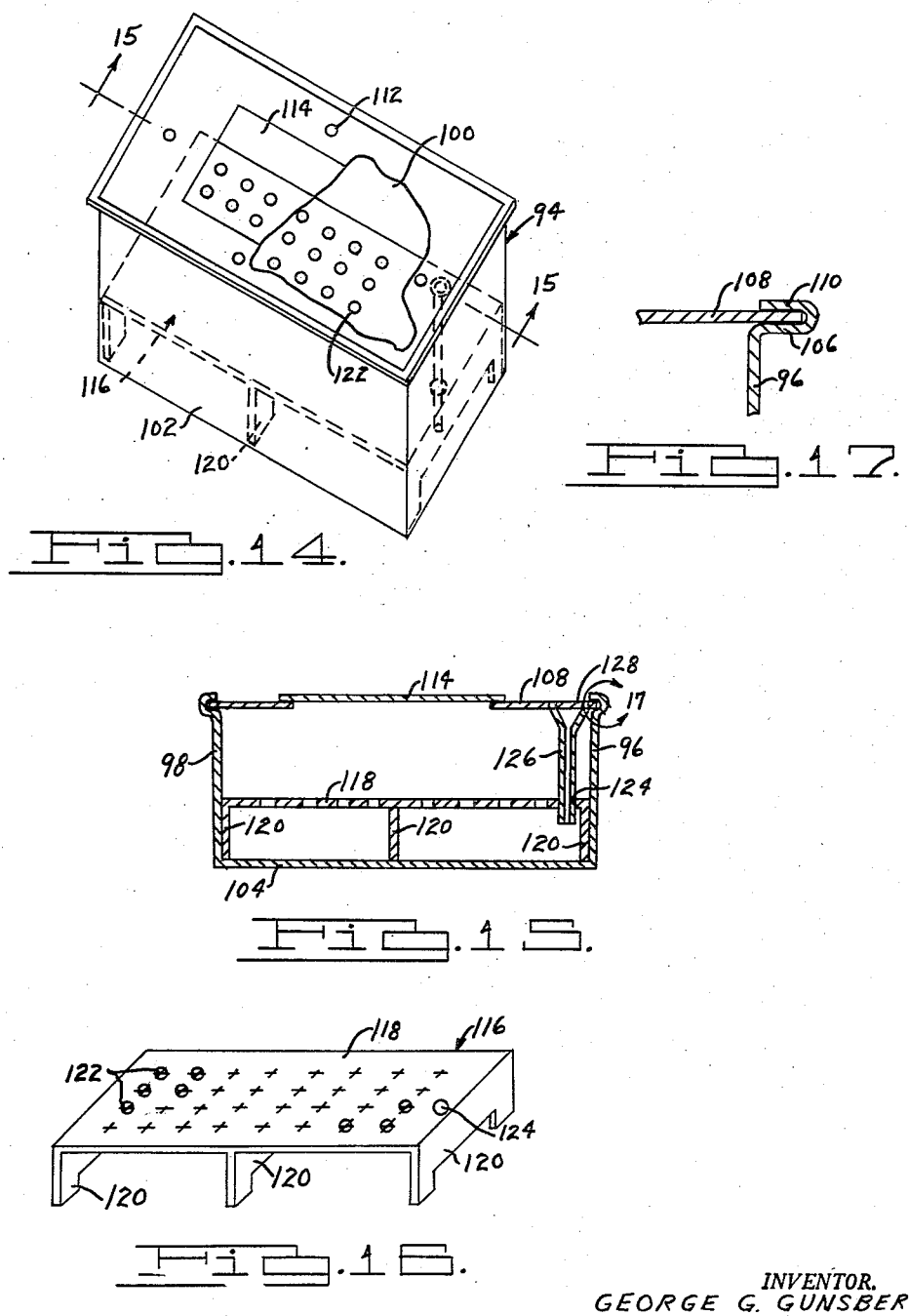

Sept. 2, 1958 G. G. GUNSBERG 2,850,392
FROZEN FOOD PACKAGE
Filed March 7, 1955 4 Sheets-Sheet 4

INVENTOR.
GEORGE G. GUNSBERG
BY
Robert D. Mentag
ATTORNEY

United States Patent Office 2,850,392
Patented Sept. 2, 1958

2,850,392

FROZEN FOOD PACKAGE

George G. Gunsberg, Huntington Woods, Mich.

Application March 7, 1955, Serial No. 492,674

3 Claims. (Cl. 99—192)

This invention relates to a packaged article of food, and, more particularly to an article of packaged frozen meat which includes a novel packaging container or carton adapted for packaging the meat and to provide a cooking utensil for quick and easy cooking of the meat without removing it from the container.

Many kinds of packaged frozen meats are presently available on the market, but it is necessary when cooking these meats to first remove them from the container and place them in a suitable cooking utensil. This involves extra time and use of extra dishes which must be cleaned later on. Accordingly, it is an important object of this invention to provide a container for packaging frozen meats, such as corned beef and the like, which also may be used for cooking the meat, without removal therefrom, in a minimum of time and without any great preparation beforehand.

It is another object of this invention to provide as an article of packaged food, a frozen meat which is sliced and ready for eating except for being cooked, and a novel container for the frozen sliced meat which is made from a suitable heat resistant material and capable of serving as a cooking utensil for the meat.

It is a further object of this invention to provide a container for frozen meats which is made from a suitable heat resistant material, such as a metal foil or the like, and which is provided with a means therein for supporting the meat and a compartment in which steam may be generated for cooking the meat.

It is a still further object of this invention to provide a container for frozen meats which is simple and rugged in construction, commercially practical and economical to manufacture, and which is adapted to function as a cooker for the meat.

Other objects, features and advantages of this invention will be apparent from the following detailed description and appended claims, reference being had to the accompanying drawings forming a part of the specification wherein like reference numerals designate corresponding parts of the several views.

In the drawings:

Fig. 8 is an enlarged broken fragmentary sectional view of the structure illustrated in Fig. 5, taken along the line 8—8 thereof;

Fig. 10 is a fragmentary perspective view of another modification of the invention;

Fig. 11 is an enlarged fragmentary sectional view of the structure illustrated in Fig. 10, taken along the line 11—11 thereof;

Fig. 12 is a fragmentary perspective view of a further modification of the invention;

Fig. 13 is an enlarged fragmentary elevational sectional view of the invention shown in Fig. 12, taken along the line 13—13 thereof;

Fig. 14 is a perspective view of a still further modification of the invention;

Fig. 15 is an elevational sectional view of the structure illustrated in Fig. 14, taken along the line 15—15 thereof;

Fig. 16 is a perspective view of the shelf used in the embodiment shown in Fig. 14;

Fig. 17 is an enlarged fragmentary view of the structure illustrated in Fig. 15, taken along and within the circle marked 17;

Figure 1:
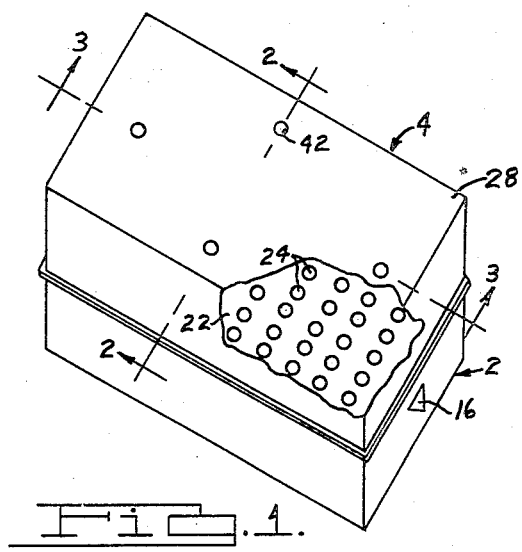
Fig. 1 is a perspective view of an illustrative embodiment of the invention.

Referring now to the drawings, and in particular to Figs. 1 through 4, an illustrative embodiment made in accordance with the principles of the invention is shown in said Figs. 1 through 4, which comprises a bottom section 2 and a top section 4. The bottom section 2 comprises a bottom wall 6 with which is integrally formed a pair of side walls 8 and 10 and a pair of end walls 12 and 14. The end wall 12 is suitably creased or marked in the form of a triangle or the like to provide an area as indicated by the numeral 16 which can be cut or broken out to permit the insertion of water into the bottom section 2 as indicated at 18.

The side and end walls of the bottom section 2 are provided with an outwardly extending flange 20 along the upper edges thereof which is adapted to support the outer edges of a shelf or meat support 22 which is provided with a plurality of apertures 24 therethrough. The shelf 22 is adapted to carry a pre-determined amount of sliced meat, as corned beef and the like, which is already for eating except for being cooked. In the drawings the meat is indicated by the numeral 26.

Figure 4:
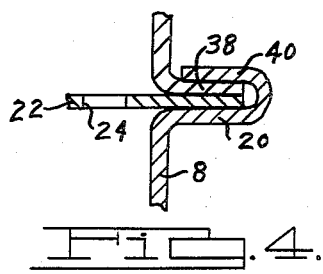
Fig. 4 is an enlarged fragmentary sectional view of the structure illustrated in Fig. 2, taken within the circle marked 4.
Figure 6:
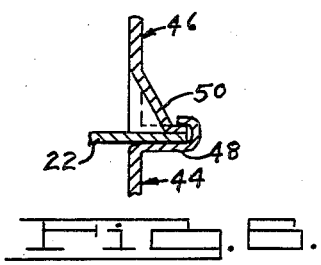
Fig. 6 is an enlarged fragmentary elevational sectional view of the structure illustrated in Fig. 5, taken along the line 6—6 thereof.
Figure 2:
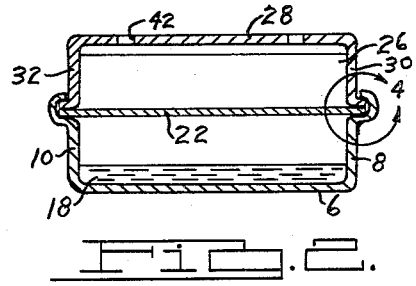
Fig. 2 is an elevational sectional view of the structure illustrated in Fig. 1, taken along the line 2—2 thereof.

The top section 4 comprises a top wall 28 with which is integrally formed a pair of side walls 30 and 32 and a pair of end walls 34 and 36. The side and end walls of the top section 4 are provided with an outwardly extending flange 38 along the lower edges thereof which is adapted to be seated on the outer edges of the shelf 22 which rest on the flange 20. As is best seen in Fig. 4, the flange 20 on the walls of the bottom section is provided with an extension which is adapted to be turned upwardly and then inwardly so as to overlie the flange 38. The aforementioned extension is designated by the numeral 40 and is adapted to be crimped in place. The top wall 28 of the top section 4 is provided with a plurality of places thereon as 42 which are prepared, as by crimping or partial perforations in circular form, so that the wall portion within the circular marking may be easily knocked out to provide a plurality of vent holes in the top wall 28.

The bottom and top sections 2 and 4, respectively, are preferably formed from a suitable metal foil, as aluminum foil or the like, or, from some other suitable heat resistant material. The size of the container formed by the bottom and top sections 2 and 4, respectively, will be determined by the amount of frozen meat which the user wishes to put in the container. For example, if the frozen meat is to be corned beef, then the bottom and top sections may be approximately two inches in height, making a container of approximately four inches high. The length and width of the container would also depend on the amount of meat to be carried by the container.

In the practice of the invention, the shelf 22 would be placed on the flange 20 of the bottom section 2, and, then, the meat 26 would be placed on the shelf 22. The meat 26 will preferably be sliced to a size suitable for ready use on a sandwich or for use with a full plate lunch or dinner. The cover or top section 4 is then placed over the meat with the flange 38 resting on the shelf edges, and, the outer part or extension 40 of the flange 20 is then turned up and over the flange 38 and is crimped in place by any suitable means. The packaged meat is then frozen in a conventional means and after freezing is ready for marketing.

The purchaser of the packaged food article of the invention will be able to keep the article in his home freezer for ready use as desired. For example, if it is desired to make some sandwiches, it is merely necessary to take the container out of the freezer, open the vent holes at the positions 42, open the flap 16 and insert some water into the bottom section 2, and place the container on a suitable heating unit. The amount of water to be added to the container and the length of cooking time will, of course, depend on the amount and type of meat used in the container, and, instructions may be placed on the container which can be easily followed and which will set forth the amount of water to be used and the cooking time. It will be obvious, that as the water is turned into steam by the heat applied to the container, which is heat resistant but very conductive to heat, the steam will rise, pass through the apertures 24 in the shelf and thus cook the meat quickly and with no fussing with any other cooking utensil. The excessive steam is permitted to pass through the vent holes 42 and out to the atmosphere. After the required cooking time has elapsed, the top section 4 may be removed by uncrimping the flange part 40 and the meat is ready for instant use as desired.

Figure 5:
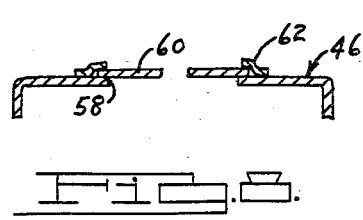
Fig. 5 is a perspective view of another embodiment of the invention.
Figure 18:
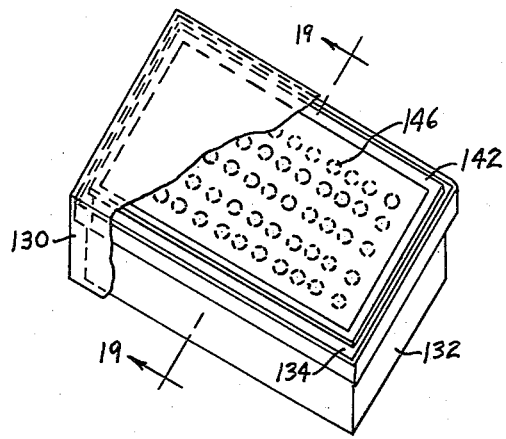
Fig. 18 is a perspective view of another modification of the invention which is assembled in a sales package.
Figure 22:
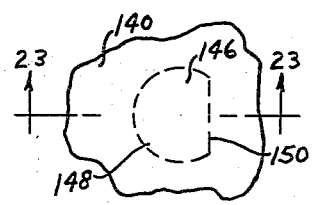
Fig. 22 is an enlarged fragmentary plan view of one of the pre-cut perforations in the meat shelf of the modification illustrated in Fig. 18; and, Fig. 23 is a sectional view of the structure illustrated in Fig. 22, taken along the line 23—23 thereof.
Figure 19:
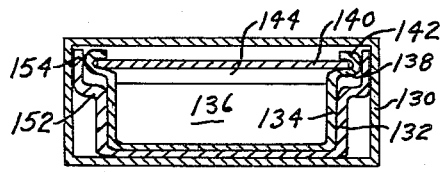
Fig. 19 is an elevational sectional view of the structure illustrated in Fig. 18, taken along the line 19—19 thereof.
Figure 23:
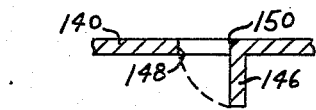

In Fig. 5 is shown a modification of the invention comprising a bottom section 44 and a top section 46 similar to the like sections of the embodiment shown in Fig. 1. This modified container is provided with a handle 48 which is formed by extending the flange on the bottom section outwardly beyond the normal amount as shown in the embodiment of Fig. 1, and for any desired length. The end wall of the top section may be projected outwardly, accordingly, so as to provide a stiffening means 50 for the handle 48.

Figure 7:
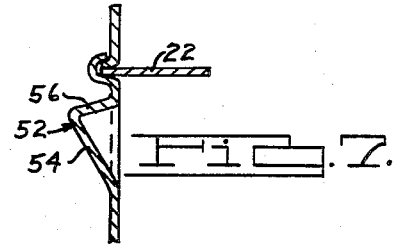
Fig. 7 is an enlarged fragmentary elevational sectional view of the structure illustrated in Fig. 5, taken along the line 7—7 thereof.
Figure 3:
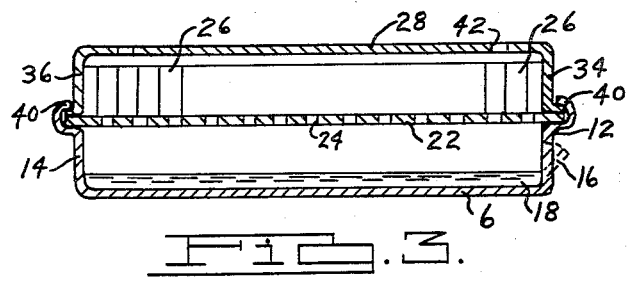
Fig. 3 is an elevational sectional view of the structure illustrated in Fig. 1, taken along the line 3—3 thereof.

The modification of Fig. 5 is also provided with a modified means for inserting the water 18 into the bottom section of the container as indicated by the numeral 52. As best seen in Fig. 7, the means 52 is formed by an outwardly extending portion 54 formed in a side wall, or an end wall, and being provided with a cover portion 56 which is integral with the portion 54 and the wall. The water 18 may be inserted by punching holes in the cover 56 and pouring the water therethrough.

The top wall of the top section 46 may be provided with an opening therethrough as 58 which is covered with a suitable transparent material 60 secured to the wall by a suitable retainer means 62. The transparent material 60 may be any suitable plastic or the like.

Figure 9:
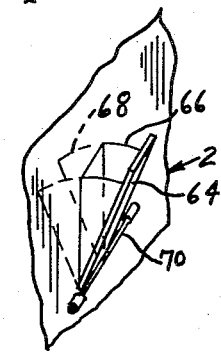
Fig. 9 is an enlarged fragmentary view of a modification of the invention.

A further means for permitting insertion of the water 18 into the bottom section of the container is shown in Fig. 9 and comprises a hingedly mounted chute having the sides 66 integral with the cover 64 which is hinged on the transverse pin 70. In Fig. 9, the chute is shown in the open position, and the closed position is shown by the dotted lines 68.

A still further means for permitting insertion of the water 18 into the bottom section of the container is shown in Figs. 10 and 11 wherein the bottom section is numbered 72 and the top section is numbered 74. The top section 74 is provided with a vertical indentation as 76 with the lower end thereof being horizontal and flush with the shelf 22 and provided with an aperture 78 therethrough. The shelf 22 is provided with a mating aperture 80 in alignment with the aperture 78. A funnel 82 is provided along with the container and the stem may be inserted through the apertures 78 and 80 to permit water to be inserted into the bottom of the container. The funnel 82 may be made from any suitable material as a plastic or the like.

Another means for permitting insertion of the water 18 into the bottom section of the container is shown in Figs. 12 and 13 wherein the bottom section is numbered 84 and the top section is numbered 86. The top section 86 is provided with a portion 88, which may be easily knocked out or cut along three sides and bent back, to permit water to be inserted. As seen in Fig. 13, the shelf 22 is provided with an aperture 90 in which is fixedly mounted a funnel 92 for conducting the water 18 to the bottom section 84.

A further embodiment of the invention is shown in Fig. 14 and comprises a container having a body portion 94 which includes the end walls 96 and 98, the side walls 100 and 102, and the bottom wall 104. The body portion 94 is preferably formed as an integral unit from a suitable metal foil or the like. The body portion walls are provided on the upper edge thereof with an outwardly extending flange 106 which is adapted to support the outer edges of the cover 108. The flange 106 is provided with an extension which is turned upwardly and inwardly to overlie the cover edges and to be crimped in place. The cover 108 is provided with suitable portions 112 which can be knocked out to provide vent holes for the container. A window 114, made from any suitable transparent material may be provided and be attached by any suitable means.

A removable shelf 116 is provided for mounting in the container shown in Fig. 14, and comprises horizontal portion 118 for carrying the meat 26, and a plurality of supporting legs as 120. As shown the legs 120 are formed integral with the part 118, but said legs may be separately formed and attached and be shaped differently than shown, if desired. The meat carrying portion 118 is provided with a plurality of apertures therethrough as 122. The shelf is provided with an enlarged aperture through the one end thereof as 124 for the reception of a funnel 126 to convey water down into the lower section of the container for steaming purposes. The cover 108 is provided with an easily removed portion 128 which is disposed over the funnel 126 for the insertion of water therethrough. In use, this container is used in the same manner as the container described hereinbefore and shown in Fig. 1.

It will be understood, that the cover 108 may be attached to the bottom section 94 in other ways than shown, but that the illustrated manner is preferable. The funnel 126 may be fixed in the shelf 116 or secured to the top 108 or merely press fitted into the shelf 116.

A further modification is shown in Figs. 18 through 23, which is similar to that of Fig. 1. The numeral 130 designates a suitable cardboard package or the like which contains the container sections 132 and 134 in a telescopically arranged package condition. The section 134, will, in use, be the top section, similar to the top section 4 of the embodiment of Fig. 1, and, it is adapted to hold the sliced frozen meat 136. The top section 134 is provided with outwardly extending flanges 138 around the periphery thereof on which is seated a cover 140. The flange 138 is adapted to be turned over the edges of the cover 140 as indicated at 142. The numeral 144 indicates a space between the cover 140 and the meat 136.

The cover 140 is provided with a plurality of pre-cut portions as indicated by the part 146 which are adapted to be punched inwardly along the pre-cut lines 148 and to be bent along the line 150 to form a plurality of apertures to permit the steam to pass therethrough and cook the meat 136, the steam being formed in the lower section 132.

Figure 20:
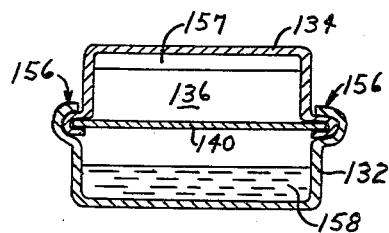
Fig. 20 is an elevational sectional view of the embodiment illustrated in Fig. 18, and in an assembled condition ready for use.
Figure 21:
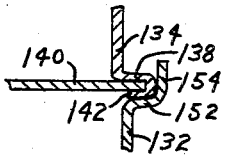
Fig. 21 is an enlarged fragmentary sectional view of the joint structure of the modification of Fig. 18.

As shown in Fig. 20, when the meat is to be cooked, the container sections 132 and 134 are taken from the package 130 and assembled as shown in either Fig. 20 or 21. The lower section 132 is provided with an outwardly extending flange 152 having an extension 154 thereon which may be turned over the flange 138 of the top section 134, as shown at 156 in Fig. 20. If desired, the extension 154 may be left standing as shown in Fig. 21 during the cooking process. When the top section 134 has been mounted on the bottom section 132, the meat 136 will fall down on the cover 140, which then operates as a shelf to hold the meat while it is cooked in a manner similar to the other modifications of the invention. As shown in Fig. 20, a space 157 will be present above the meat 136 when it is resting on the shelf 140.

The container of Figs. 18 through 23, may be made from any suitable metal foil or the like. The water 158 is put into the lower section 132 before the upper section 134 is mounted thereon. The upper section 134 is provided with pre-cut vent holes in a manner similar to the embodiment of Fig. 1, and, a window in the top section 134 may also be provided, if desired.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims. Also, it is to be understood, that the phraseology and terminology employed herein is for the purpose of description and not limitation.

What is claimed is:

1. As an article of manufacture, a frozen food package consisting of, an open top box of thin, light metal foil having a bottom wall and integral upwardly extending side and end walls; a perforated shelf mounted in said box and being spaced upwardly from the bottom wall to form a hollow compartment therebetween; frozen food adapted to be reheated prior to consumption carried in said box on said shelf; a peripheral flange at the top of the box side and end walls; a cover of thin light metal foil covering the top of the box and said frozen food; the peripheral edges of said cover resting on the peripheral flange on the box with the flange being bent around said peripheral edges; said cover being provided with a plurality of partially perforated portions adapted to be easily knocked out to provide a plurality of vent holes through the cover; and, one of the end walls of the bottom portion of the box being provided with a marked portion which can be easily removed to permit the insertion of water into the hollow compartment below the frozen food.

2. The article as defined in claim 1, wherein: a chute is hingedly mounted in an aperture in one of the end walls of the bottom portion of the box, and, the outer end of the chute is adapted to be enclosed by a cover, whereby, when the chute is swung to the open position water may be inserted into the hollow compartment below the frozen food.

3. The article as defined in claim 1, wherein: said cover is provided with a marked portion which may be easily knocked out to permit insertion of water therethrough, said shelf is provided with an aperture therethrough which is in alignment with the marked portion in said cover, and, a funnel is fixedly mounted between said marked portion and the aperture in the shelf to permit the water to pass down into the hollow compartment below the frozen food.

References Cited in the file of this patent

UNITED STATES PATENTS

| | | |
|---|---|---|
| 466,137 | Hobson | Dec. 29, 1891 |
| 523,643 | Pack | July 24, 1894 |
| 554,996 | Erlam | Feb. 18, 1896 |
| 1,881,873 | Newcomb | Oct. 11, 1932 |
| 2,073,636 | Holoubeck | Mar. 16, 1937 |
| 2,097,478 | Struble | Nov. 2, 1937 |

FOREIGN PATENTS

| | | |
|---|---|---|
| 646,499 | Great Britain | Feb. 24, 1947 |

OTHER REFERENCES

"Food Engineering," November 1951, page 156.